US010265657B2

(12) United States Patent
Rhodes et al.

(10) Patent No.: US 10,265,657 B2
(45) Date of Patent: Apr. 23, 2019

(54) TEMPERATURE MAINTENANCE AND REGULATION OF VEHICLE EXHAUST CATALYST SYSTEMS WITH PHASE CHANGE MATERIALS

(71) Applicant: Ford Global Technologies, LLC, Dearborn, MI (US)

(72) Inventors: Kevin James Rhodes, Dearborn, MI (US); Mark John Jagner, Ypsilanti, MI (US); Andrew Robert Drews, Ann Arbor, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 9 days.

(21) Appl. No.: 15/432,884

(22) Filed: Feb. 14, 2017

(65) Prior Publication Data

US 2017/0157559 A1    Jun. 8, 2017

Related U.S. Application Data

(63) Continuation of application No. 14/246,386, filed on Apr. 7, 2014, now Pat. No. 9,566,552.

(51) Int. Cl.
*B01D 53/94* (2006.01)
*F01N 3/20* (2006.01)
(Continued)

(52) U.S. Cl.
CPC .......... *B01D 53/343* (2013.01); *B01D 53/94* (2013.01); *B01D 53/944* (2013.01);
(Continued)

(58) Field of Classification Search
None
See application file for complete search history.

(56) References Cited

U.S. PATENT DOCUMENTS 4,521,532 A    6/1985  Cho
4,873,038 A    10/1989 Rapp et al.
(Continued)

FOREIGN PATENT DOCUMENTS

CA    2220210 C    7/2001
GB    2342055 A    4/2000
WO    2013098889 A1    7/2013

OTHER PUBLICATIONS

Mahadevan et al., "Reduction of Cold Start Emission Using Telescopic Catalytic Convertor in a Multi Cylinder Spark Ignition Engine," International Journal of Scientific & Engineering Research, vol. 4, Issue 6, Jun. 2013; ISSN 2229-5518, pp. 1-7.

(Continued)

*Primary Examiner* — Walter D. Griffin
*Assistant Examiner* — Jelitza M Perez
(74) *Attorney, Agent, or Firm* — Julia Voutyras; McCoy Russell LLP

(57) ABSTRACT

A vehicle exhaust system is provided and comprises a catalyst positioned in an exhaust passage of a vehicle. The catalyst is in the form of a washcoat supported on a substrate. The system includes a phase change material located adjacent to the catalyst to maintain the temperature of the catalyst between engine shut-down and subsequent start-up as well as to regulate the temperature during engine operation. In some embodiments, the phase change material comprises particles of a metal or metal alloy encapsulated in a ceramic material. The metal or metal alloy is adapted to have a phase change that occurs within a temperature range wherein the catalyst is active.

10 Claims, 6 Drawing Sheets

(51) Int. Cl.
*B01D 53/34* (2006.01)
*F01N 3/035* (2006.01)
*F01N 3/28* (2006.01)

(52) U.S. Cl.
CPC ..... *B01D 53/9431* (2013.01); *B01D 53/9454* (2013.01); *B01D 53/9477* (2013.01); *F01N 3/035* (2013.01); *F01N 3/2066* (2013.01); *F01N 3/2882* (2013.01); *B01D 53/9409* (2013.01); *B01D 53/9445* (2013.01); *B01D 2255/90* (2013.01); *B01D 2259/657* (2013.01); *F01N 2240/10* (2013.01); *F01N 2260/08* (2013.01); *F01N 2330/30* (2013.01); *F01N 2330/34* (2013.01); *F01N 2330/60* (2013.01); *F01N 2510/02* (2013.01); *F01N 2590/11* (2013.01); *F01N 2610/02* (2013.01); *Y02A 50/2324* (2018.01); *Y02A 50/2325* (2018.01); *Y02T 10/22* (2013.01); *Y02T 10/24* (2013.01)

(56) References Cited

U.S. PATENT DOCUMENTS

| | | |
|---|---|---|
| 5,477,676 A | 12/1995 | Benson et al. |
| 6,162,403 A | 12/2000 | Foster et al. |
| 6,203,764 B1 | 3/2001 | Benson |
| 6,875,407 B1 | 4/2005 | Biel, Jr. et al. |
| 6,908,595 B1 | 6/2005 | Biel, Jr. et al. |
| 6,951,099 B2 | 10/2005 | Dickau |
| 7,332,351 B2 | 2/2008 | Tan et al. |
| 7,709,414 B2 | 5/2010 | Fujdala et al. |
| 8,092,579 B2 | 1/2012 | Ziebarth et al. |
| 2009/0047188 A1 | 2/2009 | Miyairi et al. |
| 2009/0282813 A1 | 11/2009 | Kopinsky |
| 2010/0175372 A1 | 7/2010 | Lambert et al. |
| 2011/0048388 A1 | 3/2011 | Takahashi et al. |
| 2012/0251087 A1 | 10/2012 | Soukhojak et al. |

OTHER PUBLICATIONS

Favre et al., "Emissions Control Technologies to Meet Current and Future European Vehicle Emissions Legislation," AECC; 2011; pp. 1-11.
Ugurlu et al., "A review on Thermal Energy Storage Systems with Phase Change Materials in Vehicles," Electronic Journal of Vocational Colleges, May 2012; pp. 1-20.
Bokde et al., "Cold Start Performance Enhancement of Motorcycle Catalytic Convertor by Latent Heat Storage System," International Journal of Innovative Research in Science, Engineering and Technology, vol. 2, Issue 2, Feb. 2013, ISSN: 2319-8753; pp. 372-377.
Pitie et al., "Thermo-Mechanical Analysis of Ceramic Encapsulated Phase-Change-Material (PCM) particles," Energy & Environmental Science, 2011, 4, 2117; pp. 2117-2124.
Emitec, "Heated Catalysts, the Solution to Future Emission Problems," Press Release 1, 64th IAA, Sep. 2011; p. 1.
Emitec, Heated Catalysts, E-SCR System Photos; Press Release 2, 64th IAA, Sep. 2011; p. 1.
Emitec, Range Extender Photo; Press Release 3, 64th IAA, Sep. 2011; p. 1.
Burch et al., "Applications and Benefits of Catalytic Converter Thermal Management," SAE Fuels & Lubricants Spring Meeting; Dearborn, MI; May 7, 1996, No. 961134; pp. 1-6.
Burch et al., "Reducing Cold-Start Emissions by Catalytic Converter Thermal Management," http://www.nrei.gov/vehiclesandfuels/energystorage/pdfs/reducing_emissions.pdf; No. 950409; pp. 1-6.
Merriam-Webster. Shroud-definition. Merriam-Webster Dictionary. (Unkonw date). http://www.merriam-webster.com/dictionar/shroud.
Weinrich, Dan, "Codierite Mineral Data," Jonn Betts Fine Minerals, Webmineral.com, Accessed May 11, 2016, http://webmineral.com/data/Cordierite.shtml#.VzNpmP72ZRA.
Zhao, W., "High Temperature Phase Change Material," Heat Transfer Analysis of Encapsulated Phase Change Materials. Master's Thesis, Lehigh University, 2009. UMI No. 1463982, pp. 8. https://books.google.com/books?d=0K8EyBpiOGkC&printsec=frontcover&source=gbs_ge_summary_r&cad=0#v=onepage&q7f=false.

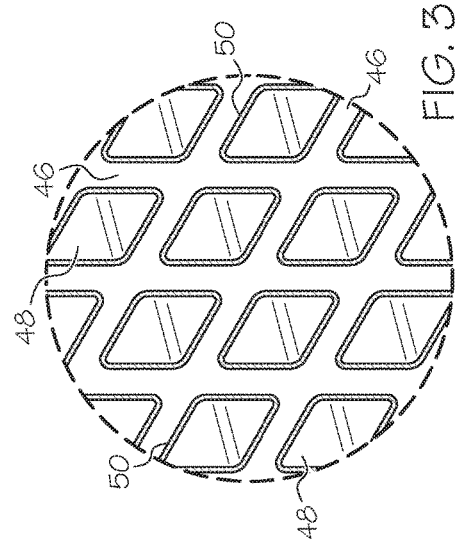
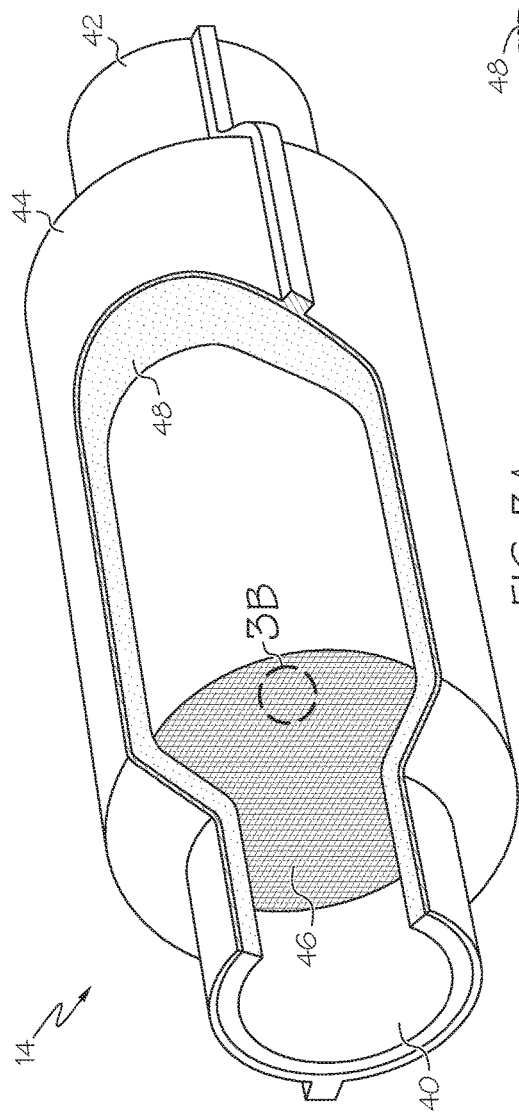

TEMPERATURE MAINTENANCE AND REGULATION OF VEHICLE EXHAUST CATALYST SYSTEMS WITH PHASE CHANGE MATERIALS

CROSS REFERENCE TO RELATED APPLICATION

The present application is a continuation of U.S. patent application Ser. No. 14/246,386, entitled "TEMPERATURE MAINTENANCE AND REGULATION OF VEHICLE EXHAUST CATALYST SYSTEMS WITH PHASE CHANGE MATERIALS," filed on Apr. 7, 2014, now U.S. Pat. No. 9,566,552, the entire contents of which are incorporated herein by reference for all purposes.

BACKGROUND

The subject matter described herein relates to vehicle exhaust systems, and in particular to the management of temperatures within such systems between engine shutdown and subsequent start-up as well as during operation.

Producing vehicles capable of meeting ever tightening emissions regulations presents challenges to manufacturers. A major component in the conversion of unwanted CO and $NO_x$ gases as well as unburned fuel to more environmentally benign chemical species is the catalytic converter system. Catalytic converters contain one or more catalyst bricks, typically in the form of a channeled substrate material such as cordierite. The substrate is wash coated with catalytically active precious metals and metal support materials such as alumina or cerium zirconium oxide.

Several technical issues exist with current catalytic converters that affect the devices' ability to operate at optimum efficiency. A first issue is that in order to operate effectively, the catalyst needs to be at elevated temperatures (above about 700° C. for a gasoline fueled vehicle and above 200° C. for a diesel vehicle). Thus, when a cold internal combustion or diesel engine with a catalytic converter is started, the emission of pollutants is high, as the catalyst within the catalytic converter does not function at low temperatures. The exhaust emitted at start-up heats the exhaust manifold and the exhaust pipe before heating the catalytic converter. It may take several minutes for the cold catalytic converter to be heated to "light off" temperature. The "light off" temperature is the temperature at which the catalytic converter oxidizes at least fifty percent of hydrocarbons in engine exhaust. It has been reported that 60 to 80 percent of all hydrocarbon emissions occur during the first few minutes after engine startup.

To reduce the emission of pollutants at startup, efforts have been directed at maintaining the catalytic converter at a functional temperature using a variety of both active and passive techniques including fuel combustion, preheating the catalytic converter, rapidly heating the catalytic converter after startup using electrical heating, or using an increased fuel to air ratio. Other efforts have involved absorbing and storing pollutants in zeolites until the catalytic converter has reached a functional temperature. However, such efforts have led to systems that are both conceptually and mechanically complex, requiring added components which add to the cost and complexity of manufacturing.

Another issue is aging of the catalyst in the converter. The aging process can include degradation of inactive materials in the converter and sintering of the finely distributed metal catalyst particles which reduces their surface area and hence their catalytic effect. These changes are initiated and/or greatly accelerated at very high temperatures above about 950° C. that can occur in heavy load operation or during a period of frequent misfire of the engine. The chemical reactions that occur in the catalyst system can also be highly exothermic and can easily raise temperatures into a range that damages the catalyst. Ideally, a catalyst system would include some means of temperature regulation, both to keep the catalyst warm when the engine is shut off for short periods (especially important for hybrid vehicles where the engine will regularly turn on and off) as well as to prevent overheating of temperature-sensitive and expensive catalyst materials.

Thus, efforts have also been made to control catalytic converter temperature during engine operation. Aspects of the technology for controlling catalytic converter temperature during engine operation are related to maintaining the catalytic converter at functional temperatures between engine uses. Some of these efforts have utilized phase change materials ("PCM") to store heat energy and inhibit heat loss during engine start-up and to absorb heat during engine operation to prevent overheating of the converter. For example, U.S. Pat. No. 5,477,676 describes a catalytic converter surrounded by variable conductance insulation that includes thermal storage media in the form of phase change materials. Typical of such systems is the presence of vacuum sealed chambers, shrouds, and jackets for containing the phase change materials when they melt. Again, the need for vacuum contained devices adds to the complexity and costs of manufacturing such catalytic converter systems.

Accordingly, the need still exists in the art for vehicle exhaust systems utilizing catalytic converters which are capable of maintaining the temperature of the catalyst between engine shut-down and subsequent start-up as well as regulating the temperature of the catalysts during engine operation, and yet which are simple in design and manufacture.

BRIEF SUMMARY

Those needs are addressed by embodiments of the present invention which provide phase change materials to a catalytic converter or other catalyst-containing component in a vehicle exhaust system without the need for complex designs or operation.

In accordance with one embodiment of the present invention, a vehicle exhaust system is provided and comprises a catalyst deposited in an exhaust passage of a vehicle. The catalyst is in the form of a washcoat deposited on a substrate. The system includes a phase change material located adjacent to the catalyst to maintain the temperature of the catalyst between engine shut-down and subsequent start-up and regulating the temperature of the catalyst during engine operation. In one embodiment, the phase change material comprises particles of a metal or metal alloy encapsulated in a ceramic material. The metal or metal alloy is adapted to have a melting point or solid-phase transition within the range of operating temperatures wherein the catalyst has activity, and preferably within an optimal operating temperature window of the catalyst (between about 700 to about 900° C. for a gasoline engine exhaust system and between about 200 to about 400° C. for a diesel exhaust system. Other suitable phase change materials that are suitable for use in embodiments of the invention include ceramic phase change materials, polymeric phase change materials (including waxes), and alkali or alkaline earth metal salt phase change materials.

In one embodiment used in an exhaust system for a gasoline engine, the phase change material comprises an alloy of beryllium and copper. In another embodiment, the phase change material comprises an alloy of manganese and bronze. In another embodiment used in a diesel engine exhaust system, the phase change material comprises tin or lead, or alloys of tin, lead, copper, and antimony such as, for example, Babbitt metal.

In some embodiments, the substrate on which the catalyst is deposited comprises cordierite. In some embodiments, the ceramic material encapsulating the phase change material comprises alumina.

In different embodiments, the phase change material may be positioned in a shroud around said catalyst. Alternatively, the phase change material may be incorporated into the substrate. In yet another alternative embodiment, the phase change material may be included with the catalyst in the washcoat. In all of the embodiments, because the phase change material is encapsulated, there is no need to place the material in a sealed (vacuum or pressurized) container or vessel. Additionally, because the phase change material is in the form of small particles, the particle can be positioned in close proximity to the catalyst.

In accordance with another embodiment of the present invention, a vehicle exhaust system is provided and comprises a catalyst positioned in an exhaust passage of a vehicle. A honeycomb body is provided and comprises partition walls disposed to form a plurality of cells extending between the end faces of the body. The catalyst is deposited as a washcoat on at least a portion of the partition walls of the body. A phase change material is deposited in at least a portion of said cells such that the phase change material is located adjacent the catalyst such that the temperature of the catalyst is maintained between engine shut-down and subsequent start-up and is regulated during operation of the vehicle.

In an embodiment for the exhaust system of a gasoline engine, the phase change material may comprise a metal or metal alloy having a melting point or phase transition of between about 700 to about 900° C. In an embodiment for the exhaust system for a diesel engine, the phase change material may comprise a metal or metal alloy having a melting point or phase transition of between about 200 to about 400° C. A plurality of phase change materials having different melting points can be utilized, and the particles can be blended together in any ratio as needed.

Accordingly, it is a feature of the present invention to provide vehicle exhaust systems utilizing catalytic converters which are better able to maintain the temperature of the catalyst between engine shut-down and subsequent start-up and which are also capable of regulating the temperature of the catalyst during engine operation, and yet which are simple in design and manufacture. Other features and advantages of the present invention will be apparent from the following detailed description, the accompanying drawings, and the appended claims.

BRIEF DESCRIPTION OF THE SEVERAL VIEWS OF THE DRAWINGS

The following detailed description of specific embodiments of the present invention can be best understood when read in conjunction with the following drawings, where like structure is indicated with like reference numerals and in which:

FIG. 3A is a perspective view, partially cut-away, of a catalytic converter body in accordance with embodiments of the present invention;

FIG. 3B is an enlarged view of the honeycomb structure of the monolithic substrate with the catalyst washcoat deposited thereon;

DETAILED DESCRIPTION

Figure 1:
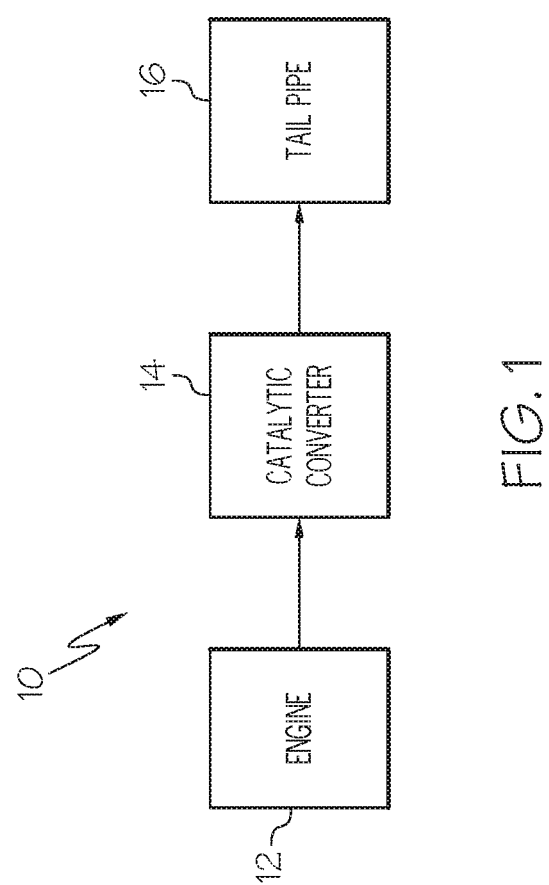
FIG. 1 is an overview, in schematic form, of the basic elements of a vehicle exhaust system for a gasoline engine that includes a catalytic converter in accordance with embodiments of the present invention.

Referring initially to FIG. 1, a schematic representation of a typical vehicle exhaust system 10 for a gasoline engine is shown. As can be seen, the combustion process that occurs in engine 12 produces pollutants such as carbon monoxide, various unburned hydrocarbons, particulate matter, and nitrogen oxides ($NO_x$) in an exhaust gas stream that are discharged to the environment through tail pipe 16. To remove such pollutants before they are discharged to the environment, a catalytic converter 14 is positioned downstream from the engine 12. Converter 14 contains supported catalysts on a substrate that treat the exhaust gas through chemical reactions that are catalyzed by the presence of the catalysts. For example, these reactions include the oxidation of carbon monoxide to form carbon dioxide. Unburned hydrocarbons are also oxidized to form carbon dioxide and water vapor. Nitrogen oxides ($NO_x$) are reduced and ultimately converted to nitrogen. A particulate filter trap (not shown) may also be positioned downstream of the engine to trap any particulate matter contained in the exhaust gas. Such a filter or trap may also contain catalysts designed to convert such particulates into environmentally benign matter.

Figure 2:
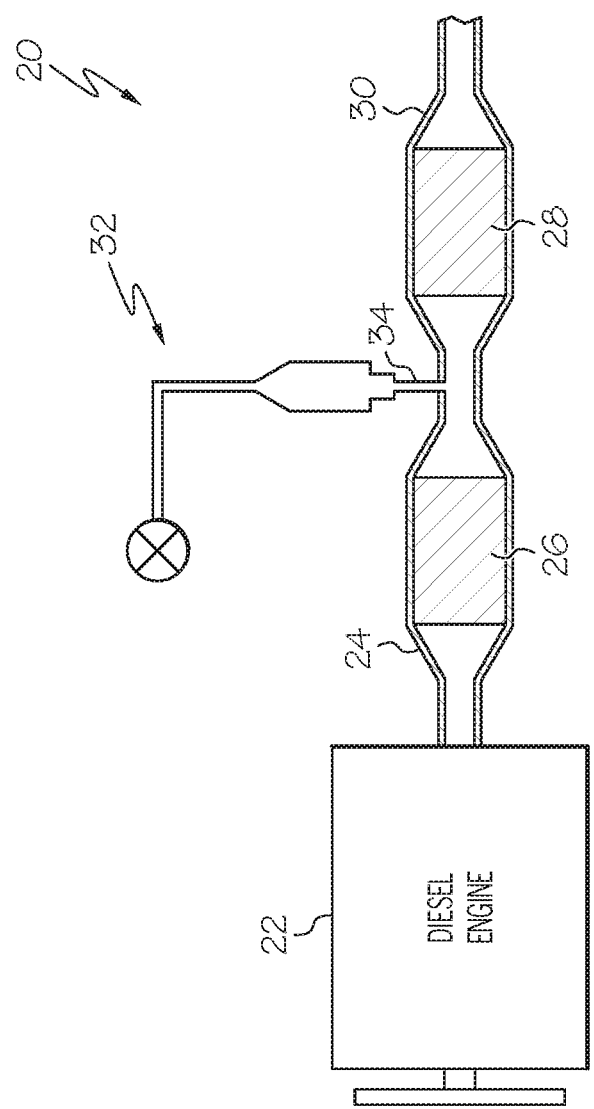
FIG. 2 is an overview, in schematic form, of the basic elements of a vehicle exhaust system for a diesel engine that includes a catalytic components in accordance with embodiments of the present invention.

FIG. 2 is a schematic representation of a typical diesel exhaust system 20. As shown, exhaust gases from diesel engine 22 pass into a housing 24 containing a diesel oxidation catalyst 26 on a refractory support. Downstream from diesel oxidation catalyst 26 is a diesel particulate filter 28 in a container or housing 30. The system further includes a reductant delivery system 32 which delivers, through injector 34, a source of a reductant such as ammonia (typically from an aqueous urea source) to the exhaust stream. The diesel particulate filter 28 is typically fabricated of a porous material which traps particulate matter entrained in the exhaust gas stream. Optionally, an SCR catalyst may be washcoated on the walls of the particulate filter substrate. Other configurations of the diesel exhaust system are possible and are within the skill of the art.

Generally, catalysts useful in the practice of embodiments of the present invention may include diesel oxidation catalysts, ammonia-slip catalysts, SCR catalysts, or such catalysts incorporated as components in a three-way catalyst. Such catalysts generally are known to operate most efficiently within a limited range of temperatures. On heating, the catalyst becomes more efficient and the temperature at which it reaches 50% of maximum activity is often referred to as the light-off temperature, which roughly defines the lower limit of the ideal operating range for the catalyst. For a precious metal catalyst used in the exhaust system of a gasoline engine, the light-off temperature is often between 500° C. and 700° C., while for a diesel oxidation catalyst, the light-off temperature is often above about 200° C. It is also known that at very high temperatures (i.e., those above about 950° C. for a gasoline engine catalyst), the catalyst activity suffers permanent degradation.

Materials that undergo transitions between chemical or physical phases may absorb or liberate heat. An example of a phase transition is the transformation of solid ice to liquid water. On heating ice to the melting temperature, additional heat must be added (beyond that defined by the heat capacity of the solid phase) to supply the thermodynamic energy associated with the change in entropy between the liquid and solid phases. This additional energy is often referred to as the latent heat of melting. On cooling liquid water to a temperature below the freezing point, the latent energy is liberated in the form of heat. Other examples of phase transitions that have latent heats (known as first-order phase transitions) are liquid to gas transitions. In chemical reactions, additional energy may be realized because of the difference in enthalpy of the initial and final chemical states. In many PCM materials, thermodynamic state transitions are always fully reversible and most solid-liquid transitions involve only a small volume change.

Implementation of a PCM material to regulate the temperature of an object or system is accomplished by placing the PCM in thermal contact with the target object or system either permanently (passive regulation), or where the contact between the PCM and the target system may be altered to isolate the two components from time to time to further manipulate the flow of heat between the two systems (active regulation). A hypothetical example of where a PCM-based temperature regulation system may be desirable is a target that has an ideal operating temperature of 0° C. but is in contact with an either a variable temperature environment or one that produces variable amounts of heat during operation. In either case, attempting to regulate the temperature of the target by thermally isolating the target using only thermal insulation will only be partially effective because there may be occasions where a gain or loss of heat from/to the environment may improve operation. Placing a mass of a PCM material with a phase transition temperature of 0° C. in contact with the target will mitigate the effects of fluctuations in the environment or in the amount of heat generated by the absorption or release of heat by the PCM as it transitions between its two internal thermodynamic states.

Embodiments of the present invention provide phase change materials in close proximity or adjacent to the catalysts in the converter to provide stored heat upon engine start-up to reduce the time needed for the catalysts to reach their respective light-off temperatures and to absorb heat during engine operation so that the catalysts will not become overheated and degrade.

FIG. 3A illustrates an example of a catalytic converter structure 14 having an inlet 40 and an outlet 42 through which the exhaust gases containing unburned hydrocarbons, carbon monoxide, and nitrogen oxides flow. The converter 14 also includes a cover or housing 44, a monolithic substrate 46, and a layer of insulation 48 between the cover and substrate.

Converter 14 is shown with a cut-away section to illustrate the honeycomb structure of the monolithic substrate 46. In the exploded view of FIG. 3B of the substrate 46, detail of the honeycomb structure is shown including a plurality of cells or channels 48. A catalyst washcoat 50 is shown forming a thin coating on the walls of cells 48. As is known in the art, the washcoat is made from a liquid slurry of catalyst particles supported on a high surface area ceramic powder, and the slurry is flowed through the cells to deposit a thin layer of catalyst onto the internal surfaces of the cells. Once dried, the entire substrate and washcoat structure is calcined.

Substrate 46 may be formed using methods known in the art including extrusion of a "green" honeycomb structure from a paste of ceramic particles and a binder. Suitable ceramic materials include cordierite or other low thermal expansion ceramics such as, for example, cerium and zirconium oxide. In some embodiments, the walls of substrate 46 are porous such that exhaust gases pass through the walls and the catalyst washcoat thereon to form a filter to remove particulates. A typical cordierite support has a low coefficient of thermal expansion ($<1 \times 10^{-6}$/° C.), about 400 cells/in$^2$, a porosity of 50 vol. %, and a pore size of 0.5-5.0 µm.

In another embodiment (not shown), the substrate may be formed from a high temperature metallic alloy. As is known in the art, a ribbon of metal foil with crenulations perpendicular to the ribbon's length is rolled to form a cylindrical body. The crenulations form a multitude of gas passages along the length of the cylinder. In some cases, the rolled body is brazed to bond the foil surfaces together at their points of contact and form a rigid body. As described above, the substrate is then coated with the catalyst washcoat slurry, dried, and then calcined to provide active catalyst particles in the gas passages.

Figure 4:
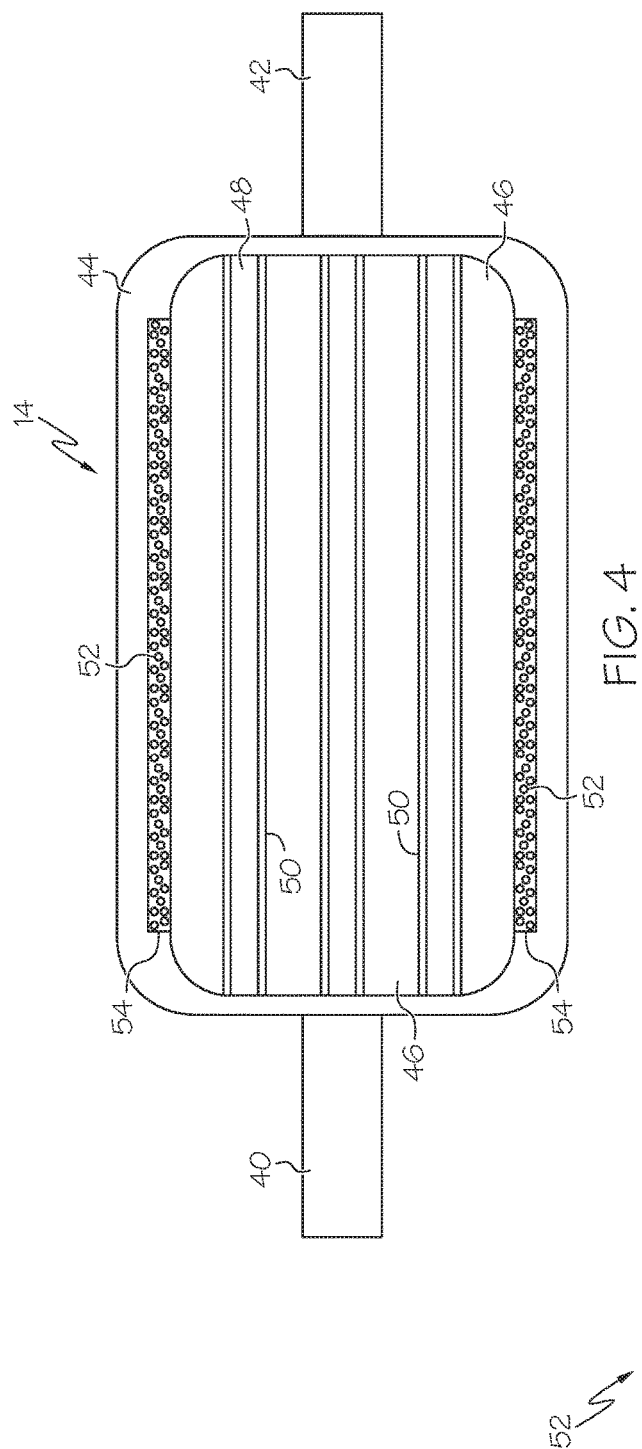
FIG. 4 is a schematic side view of an embodiment of the present invention in which phase change material is included in a shroud around the catalyst.

FIGS. 4 through 7 illustrate, in schematic form, embodiments of the present invention in which phase change materials are positioned in close proximity to the catalyst in a catalytic converter. As shown in FIG. 4, where like reference numerals represent like elements, catalytic converter 14, with inlet 40, outlet 42, and cover 44 includes substrate 46 having channels 48 extending longitudinally therethrough. In this embodiment, the phase change materials 52, in particulate form, are contained in a shroud 54 which extends substantially around the catalyst substrate 46.

During engine operation, the heated exhaust gas flows through converter 14, raising the temperature of the catalyst 50 to its light-off temperature such that the catalyst functions to treat pollutants in the exhaust gas stream. Phase change particles 52 absorb excess heat from the converter to regulate its temperature with a desired operating range, typically between about 700° to about 900° C. for a gasoline engine exhaust system. It is within the scope of embodiments of the present invention to provide a mixture of phase change particles having different metals and/or alloys with different melting points or phase transitions. Thus, different phase change materials can be included in converter 14 to optimize temperature regulation of the catalyst both upon engine start-up as well as during normal engine operation.

Figure 5:
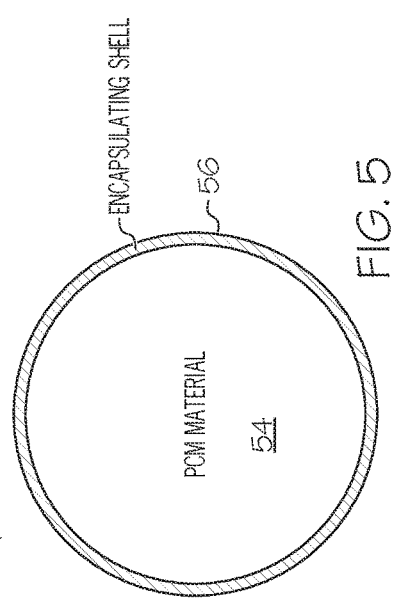
FIG. 5 is a schematic view of a particle of phase change material encapsulated in a ceramic shell.

An enlarged schematic illustration of a phase change particle in accordance with embodiments of the present invention is shown in FIG. 5. There, the phase change particle 52 includes a core of phase change material 54 encapsulated in a shell 56. With the phase change materials encapsulated, the need for housing these materials in complex and costly sealed chambers, vacuums, or pressurized devices is eliminated.

Typically, the phase change particles will be from about 10 nm to about 100 μm in diameter, and preferably from about 100 nm to about 10 μm in diameter. The phase change materials are selected to have a melting point within the normal operating temperatures encountered in the converter, e.g., between about 700° and about 900° C. for a gasoline engine exhaust system and between about 200° to about 400° C. for a diesel exhaust system. The phase change materials preferably comprise metals or metal alloys. Suitable phase change materials for a gasoline engine exhaust system include alloys of beryllium and copper (m.p. 865-955° C.) and alloys of manganese and bronze (m.p. 865-890° C.). Melting points of other suitable metals and metal alloys are known or can be readily determined.

Preferably, the metals or alloys chosen have large latent heats of fusion such that large amounts of heat energy can be stored and released as needed. For example, beryllium has a latent heat of fusion of about 1356 kJ/kg, while copper has a latent heat of fusion of about 205 kJ/kg and manganese has a latent heat of fusion of about 268 kJ/kg. It is also desirable that the phase change materials exhibit minimal volume change upon melting and solidifying.

The shell 56 is preferably made of a ceramic material such as alumina, silica, zirconia, or the native oxide of the phase change material, all of which have melting temperatures far above any temperatures which will be encountered in a catalytic converter. The core and shell phase change particles may be made by any of a number of known techniques. For example, flame spray techniques may be used to create a stream of small metal drops which are then encapsulated within shells of ceramic material. Alternatively, small metal particles may be formed, and the ceramic shell formed around the metal particles using a liquid slurry containing ceramic particles in a binder which is then dried and calcined. Other suitable encapsulating techniques include sputtering, chemical vapor deposition (CVD), and physical vapor deposition (PVD).

Figure 6A:
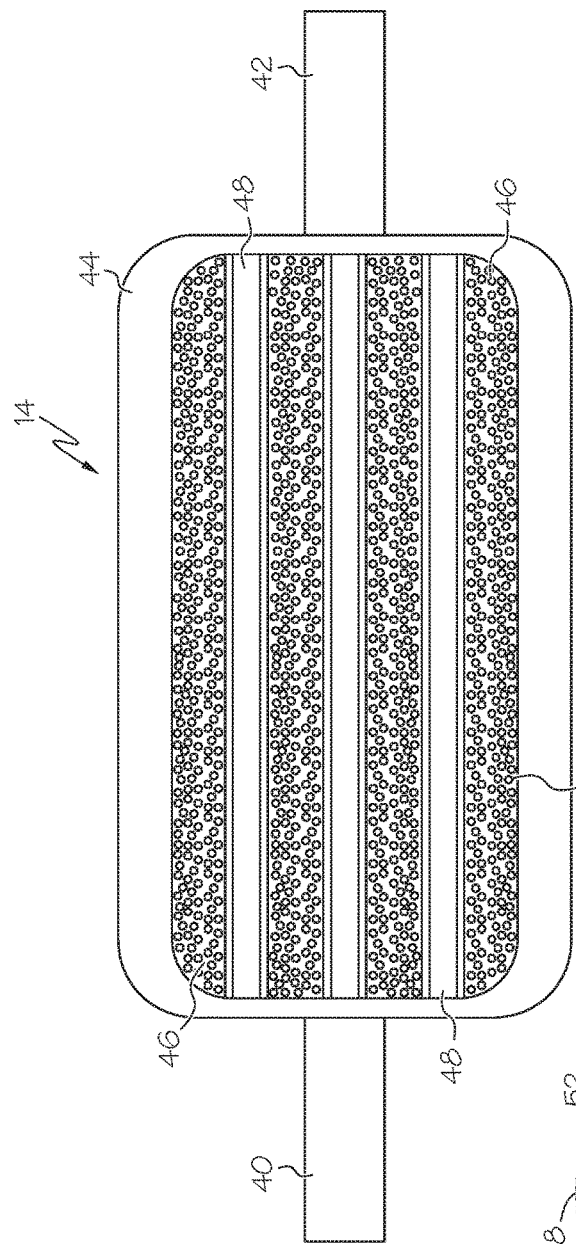
FIG. 6A is a schematic side view of an embodiment of the present invention in which phase change material is included in the substrate.
Figure 6B:
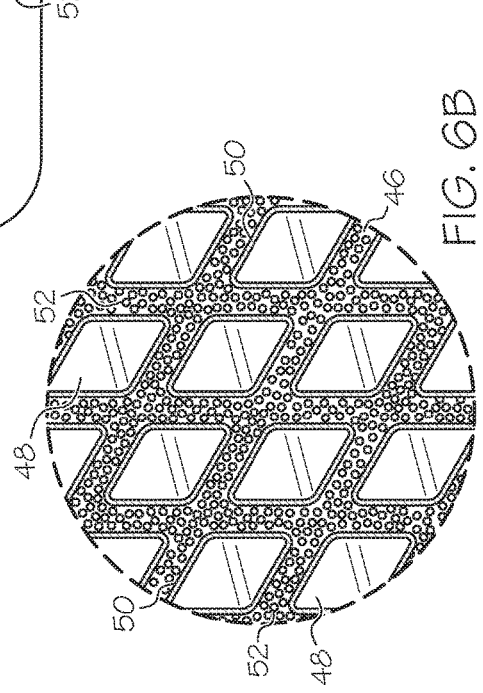
FIG. 6B is an enlarged perspective view of this embodiment.

FIGS. 6A and 6B illustrate another embodiment in which the phase change materials 52 are incorporated into the substrate 46 in catalytic converter 14. As shown, substrate 46 can be made by extrusion techniques to form the honeycomb cell structure. Prior to extrusion, encapsulated phase change material particles may be mixed in with the ceramic particles making up the substrate structure. After the structure has been extruded, the honeycomb is dried and calcined. Because the calcining temperature is well below the melting point of the ceramic shell material 56 for the phase change particles, the particles remain intact in the honeycomb structure. When exposed to the hot exhaust gas from the vehicle engine, the phase change particles 52 absorb and store, or alternatively release, heat energy as needed.

Figure 7A:
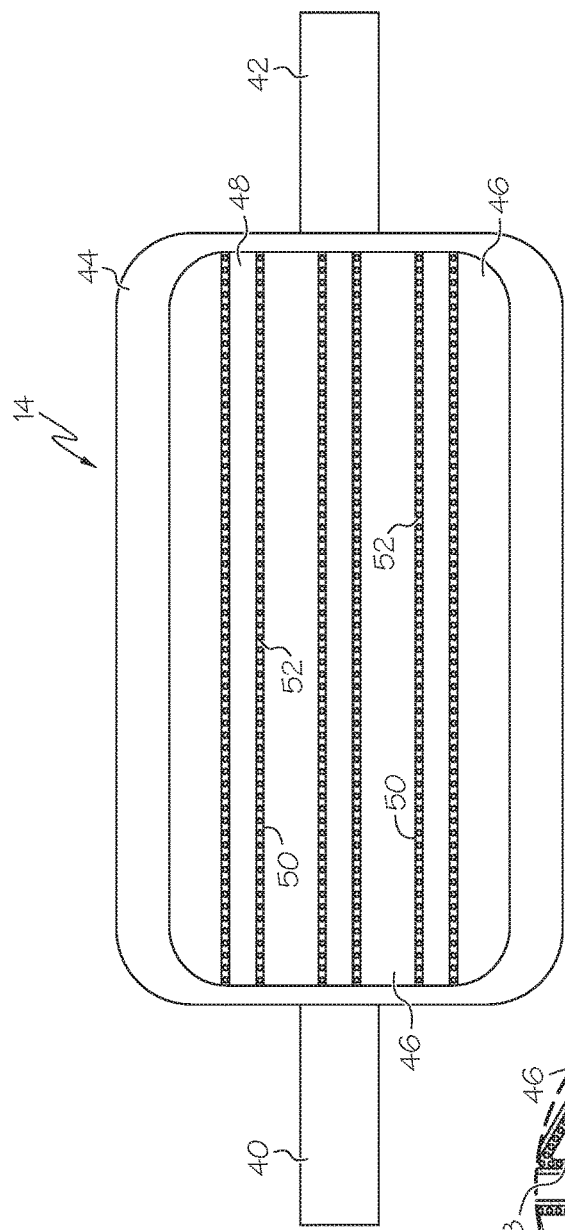
FIG. 7A is a schematic side view of an embodiment of the present invention in which phase change material is incorporated into the catalyst washcoat on the substrate body.
Figure 7B:
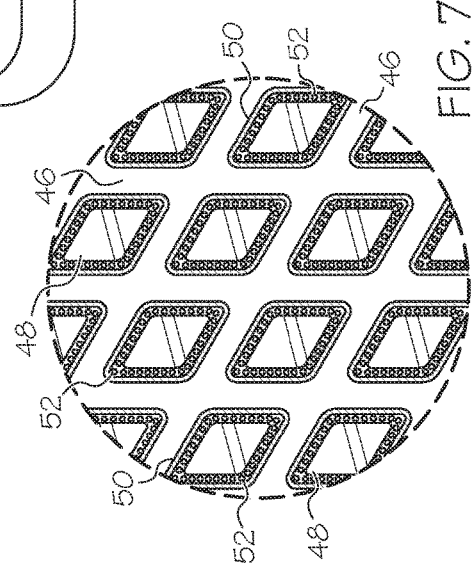
FIG. 7B is an enlarged perspective view of this embodiment.

FIGS. 7A and 7B illustrate yet another embodiment of catalytic converter 14 in which the phase change materials 52 are incorporated into the catalyst washcoat 50 on the cell walls of substrate 46. Typically, washcoat 50 is applied to the walls of substrate 46 as a liquid slurry of catalyst particles. In this embodiment, particles of phase change materials 52 are mixed together with catalyst particles in the slurry and are deposited along with the catalyst particles on the walls of substrate 46. When exposed to the hot exhaust gas from the vehicle engine, the phase change particles 52 absorb and store, or alternatively release, heat energy as needed. Preferably, the catalyst and phase change materials particle sizes are similar for compatibility.

It is noted that terms like "preferably," "commonly," and "typically" are not utilized herein to limit the scope of the claimed invention or to imply that certain features are critical, essential, or even important to the structure or function of the claimed invention. Rather, these terms are merely intended to highlight alternative or additional features that may or may not be utilized in a particular embodiment of the present invention.

For the purposes of describing and defining the present invention it is noted that the term "substantially" is utilized herein to represent the inherent degree of uncertainty that may be attributed to any quantitative comparison, value, measurement, or other representation. The term "substantially" is also utilized herein to represent the degree by which a quantitative representation may vary from a stated reference without resulting in a change in the basic function of the subject matter at issue.

Having described the invention in detail and by reference to specific embodiments thereof, it will be apparent that modifications and variations are possible without departing from the scope of the invention defined in the appended claims. More specifically, although some aspects of the present invention are identified herein as preferred or particularly advantageous, it is contemplated that the present invention is not necessarily limited to these preferred aspects of the invention.

What is claimed is:

1. A method for regulating a temperature of a catalyst, comprising:
absorbing heat via a phase change material (PCM) that is encapsulated in ceramic and positioned adjacent to the catalyst;
storing the heat absorbed by the PCM encapsulated in the ceramic; and
releasing the heat stored by the PCM encapsulated in the ceramic,
wherein the PCM is an alloy of beryllium and copper.

2. The method of claim 1, wherein the PCM encapsulated in the ceramic has a melting point within a same temperature range that the catalyst has activity.

3. The method of claim 1, wherein the PCM encapsulated in the ceramic has a solid-phase transition within a same temperature range that the catalyst has activity.

4. The method of claim 1, wherein the alloy of beryllium and copper has a melting point between 865° C. and 955° C.

5. A method for regulating a temperature of a catalyst comprising:
absorbing heat via a phase change material (PCM) comprising an alloy of manganese and bronze, the PCM encapsulated in ceramic, and where the PCM encapsulated in the ceramic is positioned adjacent to the catalyst; and
storing the absorbed heat in the PCM encapsulated by the ceramic.

6. The method of claim 5, wherein the alloy of manganese and bronze has a melting point between 865° C. and 890° C.

7. The method of claim 5, further comprising releasing the stored heat from the PCM encapsulated by the ceramic.

8. The method of claim 7, further comprising heating the catalyst.

9. The method of claim 5, wherein absorbing the heat via the PCM includes absorbing excess heat from the catalyst.

10. The method of claim 5, wherein the PCM encapsulated in the ceramic has a melting point within a same temperature range that the catalyst has activity.

* * * * *